United States Patent
Kato

(10) Patent No.: US 11,377,043 B2
(45) Date of Patent: Jul. 5, 2022

(54) OPERATING DEVICE

(71) Applicant: ALPINE ELECTRONICS, INC., Tokyo (JP)

(72) Inventor: Kazunari Kato, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 196 days.

(21) Appl. No.: 16/927,099

(22) Filed: Jul. 13, 2020

(65) Prior Publication Data
US 2021/0053504 A1 Feb. 25, 2021

(30) Foreign Application Priority Data
Aug. 23, 2019 (JP) .............................. JP2019-152781

(51) Int. Cl.
*B60R 11/02* (2006.01)
*G06F 1/16* (2006.01)

(52) U.S. Cl.
CPC ........ *B60R 11/0229* (2013.01); *G06F 1/1643* (2013.01); *G06F 1/1656* (2013.01)

(58) Field of Classification Search
CPC ............. B60R 11/0229; B60R 11/0235; G06F 1/1643; G06F 1/1656; G06F 1/1601; G06F 3/016; G06F 3/0412; G06F 3/044; G06F 3/045
See application file for complete search history.

(56) References Cited

U.S. PATENT DOCUMENTS

| | | | |
|---|---|---|---|
| 10,345,862 B1 * | 7/2019 | Douzono | ............ G06F 1/1656 |
| 2011/0267551 A1 | 11/2011 | Yokote | |
| 2012/0099267 A1 * | 4/2012 | Ahn | ...................... G06F 1/1632 |
| | | | 248/346.06 |
| 2015/0138727 A1 * | 5/2015 | Lin | ...................... H01R 13/639 |
| | | | 439/571 |
| 2016/0098145 A1 | 4/2016 | Redelsheimer et al. | |

(Continued)

FOREIGN PATENT DOCUMENTS

| EP | 2444873 A2 * | 4/2012 | ............ F16M 11/10 |
|---|---|---|---|
| JP | 5805571 | 9/2015 | |
| JP | 6426446 | 11/2018 | |

OTHER PUBLICATIONS

Extended European Search Report for 20190993.4 dated Oct. 5, 2020, 7 pgs.

*Primary Examiner* — Fernando Alcon
(74) *Attorney, Agent, or Firm* — Crowell & Moring LLP

(57) ABSTRACT

An operating device makes it possible to efficiently apply a response force to an operating unit from a response force applying mechanism. In a supporting mechanical section provided between the operating unit and a supporting member, a connecting shaft section is provided at one of the operating unit and the supporting member and a connecting receiving section is provided at the other of the operating unit and the supporting member, the connecting shaft section is supported by the connecting receiving section so as to be movable in a first direction, and a restoring member that causes the operating unit to be restored forward is provided. The connecting receiving section includes a first elastic member that continues supporting the connecting shaft section from both sides thereof in a second direction intersecting the first direction while the connecting shaft section moves in the first direction that is a front-rear direction.

20 Claims, 9 Drawing Sheets

(56) References Cited

U.S. PATENT DOCUMENTS

2019/0090364 A1\* 3/2019 Shin ................ G09F 9/301
2019/0219220 A1\* 7/2019 Chou ............... F16M 11/2064
2019/0324501 A1\* 10/2019 Kim ................ H04R 7/045

\* cited by examiner

OPERATING DEVICE

RELATED APPLICATION

The present application claims priority to Japanese Patent Application Number 2019-152781, filed Aug. 23, 2019, the entirety of which is hereby incorporated by reference.

BACKGROUND

1. Field of the Invention

The present invention relates to an operating device that, when an operating section provided with an operating unit has been operated by a user, makes it possible to efficiently apply a response force to the operating unit from a response force applying mechanism.

2. Description of the Related Art

Hitherto, an operating device including a response force applying mechanism that applies a response force to a user has been widely used. In the operating device, an operating unit is supported by a supporting member via an elastic supporting section. The operating device includes a detecting section that detects that the operating unit has been operated and a response force applying mechanism that applies a response force to the user when the detecting section has detected that the operating unit has been operated.

As shown in FIG. 3, an operating device described in Japanese Patent No. 6426446 (Patent Literature (PTL) 1) has a dual stiffness suspension system in which an actuator is fixed to a rear surface of a touch screen, and the touch screen and a housing structural component are connected to each other. In the dual stiffness suspension, the touch screen is supported so as to be movable only in a Z direction orthogonal to a surface of the touch screen with respect to the housing structural component. The dual stiffness suspension system includes two members, that is, a first member having a first rigidity and a second member having a second rigidity, with a housing between them. Here, the first rigidity of the first member is higher than the second rigidity of the second member.

In the dual stiffness suspension system, when a user presses the touch screen in a Z-axis direction with his/her finger, the first member having the higher rigidity applies a large deformation resistance to the user's finger, and is capable of causing the user to feel as if he/she feels that the touch screen is firmly mounted. In tactile feedback provided to the user, as described in paragraph number 0017, a force is linearly applied in the Z-axis direction to the touch screen from the actuator. When the actuator applies a response force to the touch panel, the second member having the lower rigidity tends to deform. Therefore, it is possible to apply a large response force to the touch panel.

As shown in FIG. 6, an operating device described in Japanese Patent No. 5805571 (PTL 2) includes a touch panel to whose rear surface a vibrating section is fixed, an upper housing, a lower housing, a first elastic member that is interposed between the upper housing and the touch panel, and a second elastic member that is interposed between the touch panel and the lower housing. The elastic modulus of the first elastic member is lower than the elastic modulus of the second elastic member.

Therefore, when the upper housing and the lower housing are in a combined state, the amount by which the first elastic member is compressed is larger than the amount by which the second elastic member is compressed, and thus the first elastic member is capable of causing the touch panel to vibrate more freely and the attenuation in vibration can be further decreased.

In the invention described in PTL 1, when the touch screen is pressed in a direction (the Z direction) orthogonal to a surface of the touch screen and the pressing is detected, Z-direction tactile feedback is provided to the touch screen. In this structure, since the direction in which the touch screen is pressed and the direction of vibration of the tactile feedback that is provided to the touch screen are the same, that is, the Z direction, the tactile feedback cannot be effectively provided to a finger that has operated the touch screen.

In contrast, since in the operating device described in PTL 2, the touch panel is interposed and fixed between the first elastic member and the second elastic member, the touch panel is movable not only in the Z direction orthogonal to a surface of the touch panel but also in an X direction and a Y direction. However, when the touch panel moves in the X direction or the Y direction, a support rigidity of the touch panel is equal to the sum of the rigidity of the first elastic member and the rigidity of the second elastic member, and thus the vibration of tactile feedback is largely attenuated.

SUMMARY

The present disclosure makes it possible to solve the existing problems above, and an object of the present disclosure is to provide an operating device that makes it possible to efficiently apply a response force to an operating unit from a response force applying mechanism.

According to the present disclosure, there is provided an operating device including an operating unit that includes an operating section; a supporting member that supports the operating unit; a supporting mechanical section that is provided between the operating unit and the supporting member; an operation detecting section that detects that the operating unit has been pressed rearward; and a response force applying mechanism that applies a response force to the operating unit, the response force being oriented in a second direction intersecting a first direction that is a front-rear direction. In the supporting mechanical section, a connecting shaft section is provided at one of the operating unit and the supporting member and a connecting receiving section is provided at the other of the operating unit and the supporting member, and the connecting shaft section is supported by the connecting receiving section so as to be movable in the first direction. A restoring member that causes the operating unit to be restored forward is provided. The connecting receiving section includes a first elastic member that continues supporting the connecting shaft section from both sides thereof in the second direction while the connecting shaft section moves in the first direction.

According to the operating device of the present disclosure, it is desirable that when the first elastic member is pushed in the second direction by the connecting shaft section, the first elastic member be first flexed and deformed in the second direction and then be compressed and deformed, and a force used to compress and deform the first elastic member be larger than a force used to flex and deform the first elastic member.

According to the operating device of the present disclosure, it is desirable that the connecting receiving section include a first restricting section that is spaced apart from the connecting shaft section on both sides thereof in the second direction and that faces the connecting shaft section, and the first elastic member protrude toward a side of the connecting shaft section from the first restricting section.

According to the operating device of the present disclosure, it is desirable that when the first elastic member is flexed and deformed, the first restricting section be disposed at a position where the first restricting section does not come into contact with the connecting shaft section.

According to the operating device of the present disclosure, it is desirable that the first elastic member include a first elastic protrusion and a second elastic protrusion on outer sides thereof opposite to a side where the connecting shaft section is supported, the first elastic protrusion and the second elastic protrusion protruding in the second direction and being spaced apart from each other in the first direction; the connecting receiving section include a restricting wall with which the first elastic protrusion and the second elastic protrusion come into contact; and at least a portion of the first elastic member between the first elastic protrusion and the second elastic protrusion be capable of being flexed and deformed; and
while the connecting shaft section moves in the first direction, the connecting shaft section and the first elastic member continue contacting each other between the first elastic protrusion and the second elastic protrusion.

According to the operating device of the present disclosure, it is desirable that the connecting receiving section include a second elastic member with which the connecting shaft section comes into contact when the connecting shaft section has moved forward in the first direction and when the connecting shaft section has moved rearward in the first direction.

According to the operating device of the present disclosure, it is desirable that, for example, the first elastic member and the second elastic member be portions of a same elastic body. However, in the connecting receiving section, the first elastic member and the second elastic member may be formed independently as different elastic bodies.

According to the operating device of the present disclosure, it is desirable that the connecting receiving section include a second restricting section facing the connecting shaft section in the front-rear direction, and the second elastic member protrude toward the side of the connecting shaft section from the second restricting section.

According to the operating device of the present disclosure, it is desirable that in the supporting mechanical section, a position of the connecting shaft section and a position of the connecting receiving section relative to each other be restricted in a third direction intersecting both the first direction and the second direction.

According to the operating device of the present disclosure, it is desirable that the operating unit include a display device and an exterior case that holds the display device.

According to the operating device of the present disclosure, it is desirable that the operating section be provided at a display screen of the display device.

In the operating device of the present disclosure, the supporting mechanical section not only supports the operating unit so as to be movable in the first direction, which is the front-rear direction, but also causes the operating unit to be movable in the second direction intersecting the first direction. The response force applying mechanism applies a response force to the operating unit in a direction intersecting the first direction, which is a pressing direction. Therefore, it is possible to apply a large operational opposing force to, for example, a finger that touches the operating unit. Moreover, in the supporting mechanical section, the connecting shaft section is continually supported from both sides thereof in the second direction while the connecting shaft section moves in the first direction. Therefore, even the operating unit having a large mass can be firmly supported in a direction in which a response force is applied.

DETAILED DESCRIPTION OF THE PREFERRED EMBODIMENTS

Figure 1:
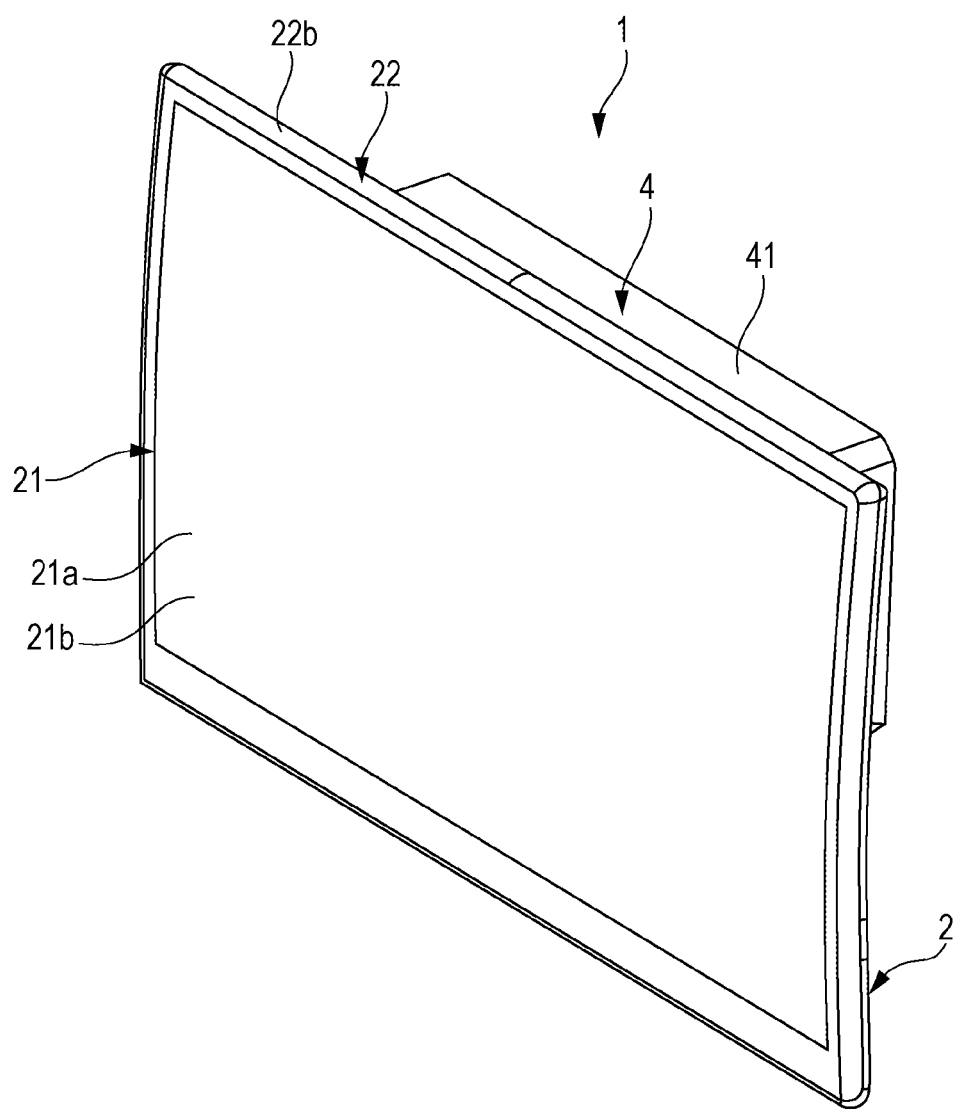
FIG. 1 is a perspective view of an operating device of an embodiment of the present invention when the operating device is seen from the front.
Figure 1:
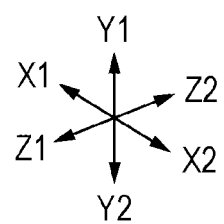
Figure 2:
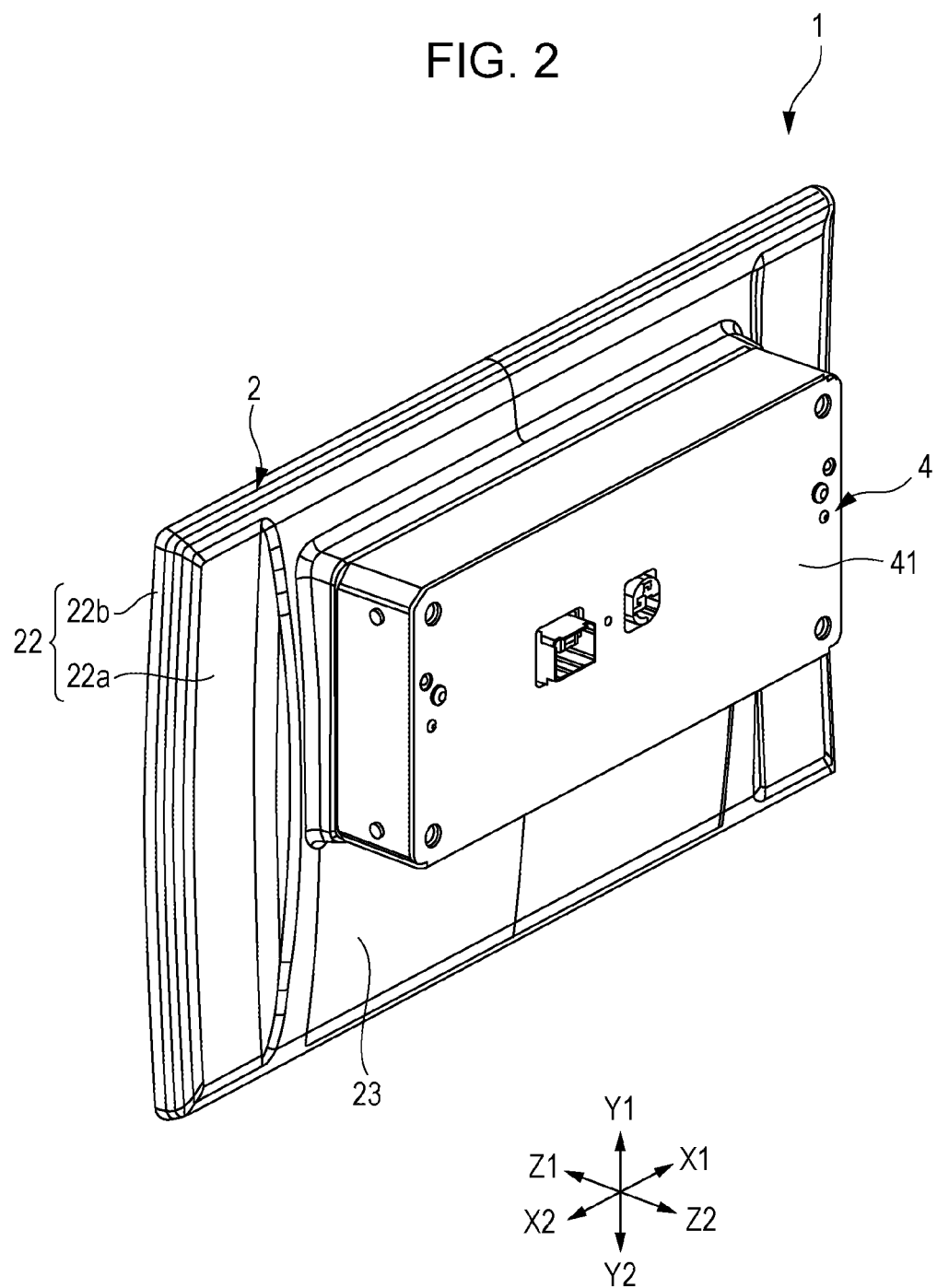
FIG. 2 is a perspective view of the operating device of the embodiment of the present invention when the operating device is seen from the rear.

FIGS. 1 and 2 each show an overall structure of an operating device 1 of an embodiment of the present invention. The operating device 1 of the embodiment is used as an on-vehicle display device. In the operating device 1, a Z1-Z2 direction is a front-rear direction (first direction). The Z1 direction is a forward direction, and the Z2 direction is a rearward direction. When the operating device 1 is used as an on-vehicle display device, the Z1 direction is oriented toward a vehicle interior, and the Z2 direction is oriented toward the front in a direction of travel of the vehicle. An X1-X2 direction is a left-right direction (second direction). The X1 direction is a leftward direction and the X2 direction is a rightward direction, and a Y1 direction is an upward direction and a Y2 direction is a downward direction.

Figure 4:
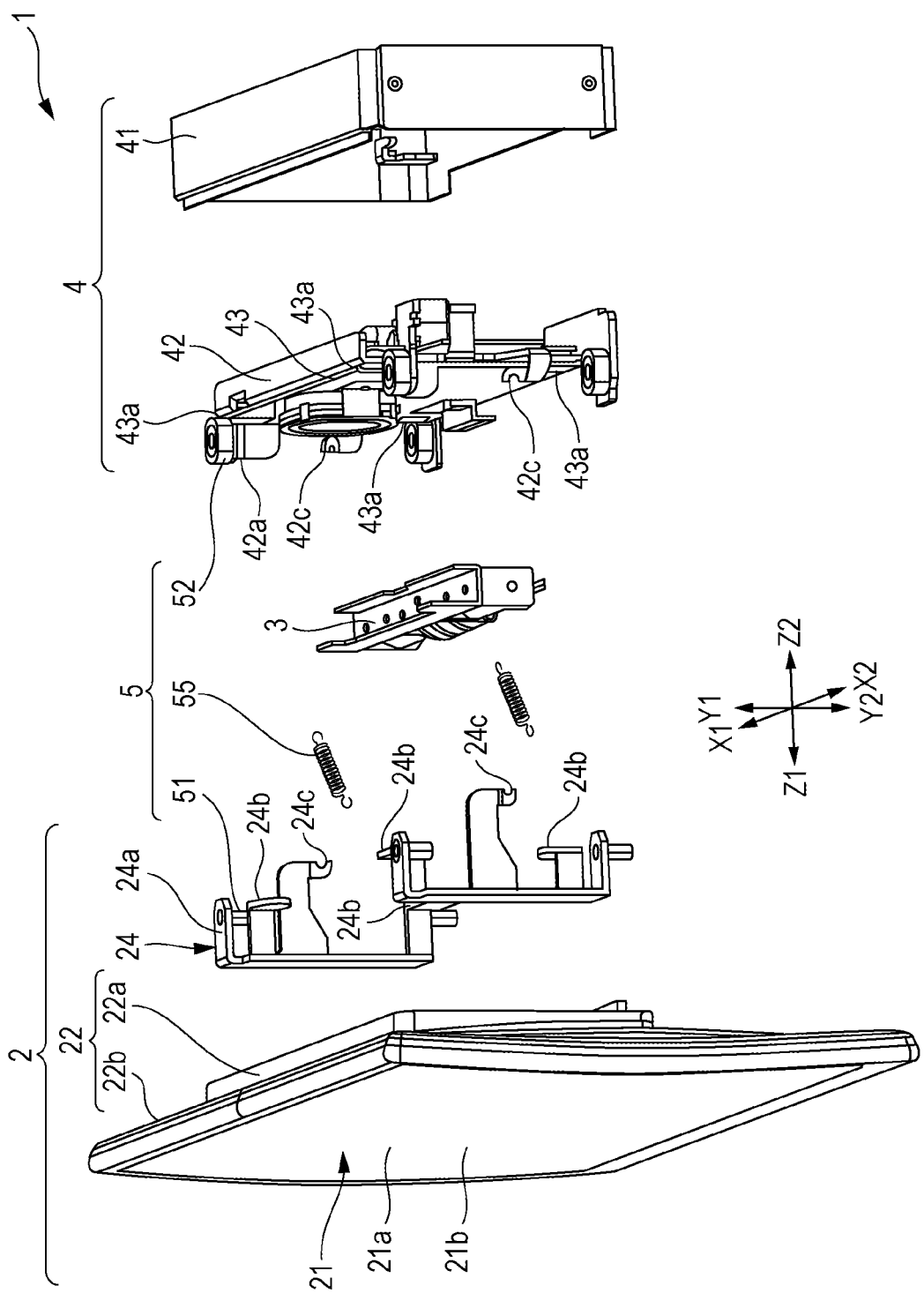
FIG. 4 is an exploded perspective view of the operating device shown in FIG. 2.

As shown in FIG. 4, the operating device 1 includes an operating unit 2, a response force applying mechanism 3, a supporting member 4, and a supporting mechanical section 5.

Figure 3:
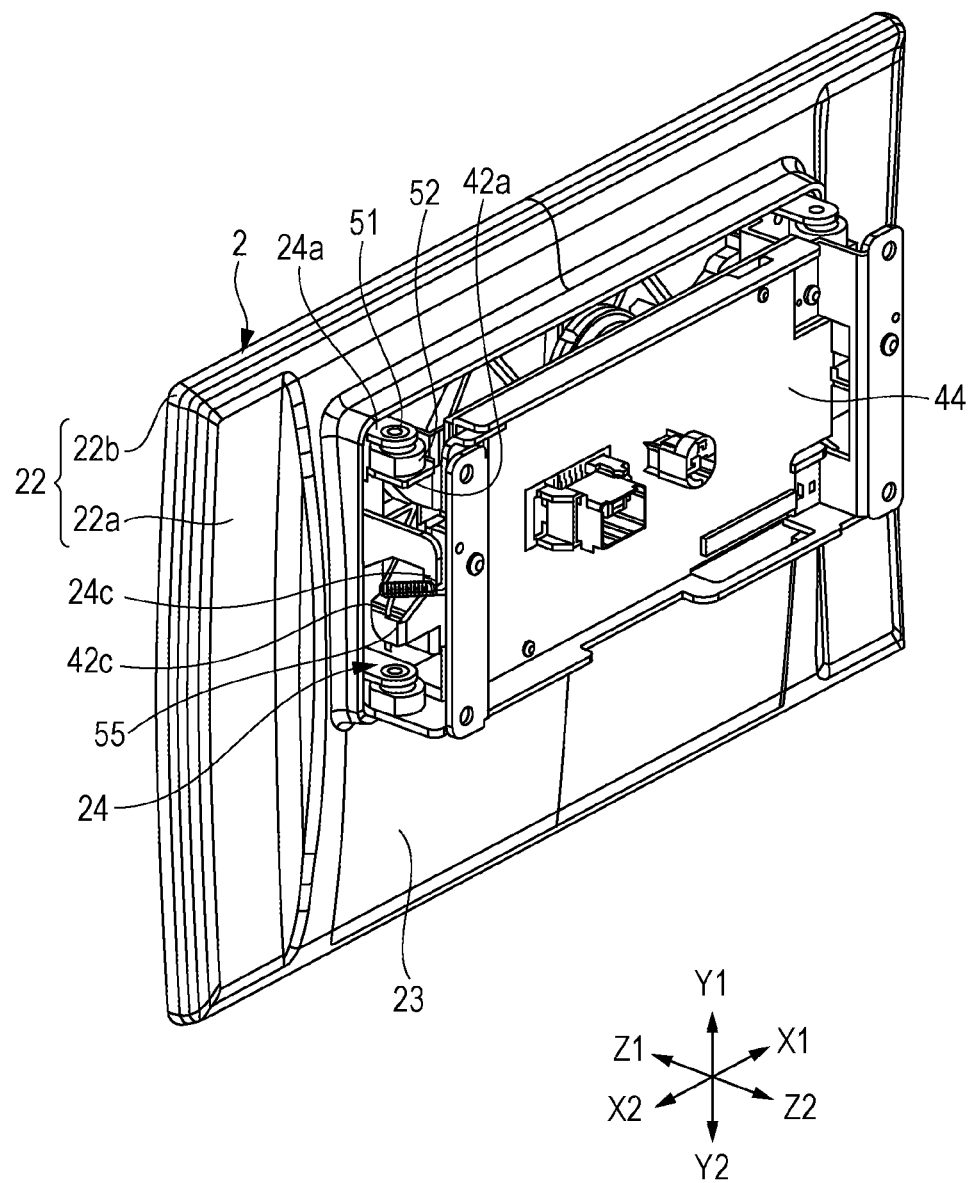
FIG. 3 is a perspective view of the operating device shown in FIG. 2 after a rear housing has been removed.

As shown in FIGS. 3 and 4, the operating unit 2 includes a display device 21, an exterior case 22, a rear cover 23, a movable-side bracket 24, and a connecting shaft section 51. The exterior case 22 is made of a synthetic resin material or a light metal material. The exterior case 22 includes a supporting body 22a and an outer edge body 22b. The outer edge body 22b protrudes forward (in the Z1 direction) from an outer peripheral portion of the supporting body 22a. The display device 21 is fixed to an inner side of the outer edge body 22b of the exterior case 22 and to a front surface of the supporting body 22a, the front surface facing forward (in the Z1 direction). The display device 21 is a color liquid-crystal display panel or an electroluminescence display panel. A front surface of the display device 21 facing forward (in the Z1 direction) is a display screen 21a.

As shown in FIG. 1, the display screen 21a has an operating section 21b including a transparent touch sensor. The touch sensor is a capacitive sensor including a plurality of transparent electrodes on a transparent substrate. When an operator touches the display screen 21a with his/her finger, the capacitance that is detected at the electrodes changes. Due to changes in the distribution of the capacitance at this time, the location of a coordinate that the finger has touched is detected. Alternatively, the touch sensor may be a resistive sensor in which a transparent film is placed upon a transparent substrate having a transparent electrode formed on its entire surface. The transparent film similarly has a transparent electrode formed on its entire surface. When any location on the transparent film of the resistive sensor is pressed, the transparent electrode formed on the transparent film and the transparent electrode formed on the transparent substrate are short-circuited, as a result of which a change in resistance up to a short-circuit section from an electrode section provided on an edge portion of the transparent electrode is detected to determine the location of the coordinate touched by the finger.

When the display device 21 is a color liquid-crystal display panel, a backlight unit is provided inside the exterior case 22 and behind the color liquid-crystal display panel (in the Z2 direction). The backlight unit includes, for example, a light source, such as a LED, and a light guiding member that allows illumination light emitted from the light source to be applied forward (in the Z1 direction) with respect to the color liquid-crystal display panel.

As shown in FIG. 2, the rear cover 23 and a rear surface (in the Z2 direction) of the supporting body 22a of the exterior case 22 are fixed to each other via a recess-and-protrusion fitting structure, the rear surface facing rearward (in the Z2 direction). As shown in FIGS. 3 and 4, the movable-side bracket 24 is fixed with a screw to a rear surface of the exterior case 22 facing rearward (in the Z2 direction) at an upper portion (in the Y1 direction) of the rear cover 23. The movable-side bracket 24 includes a connecting protrusion fixing surface 24a at which a bending surface faces an up-down direction (a Y1-Y2 direction), detecting surfaces 24b at which bending surfaces face the front-rear direction (the Z1-Z2 direction), and movable-side hook sections 24c on a rear end portion of the movable-side bracket 24. The connecting shaft section 51 is press-fitted into a hole formed in the connecting protrusion fixing surface 24a of the movable-side bracket 24, and is fixed to the hole with an axis of the connecting shaft section 51 facing the up-down direction (the Y1-Y2 direction). In the embodiment, the connecting shaft section 51 constitutes a portion of the operating unit 2 and a portion of the supporting mechanical section 5.

The response force applying mechanism 3 is fixed to the surface, facing rearward (in the Z2 direction), of the supporting body 22a of the exterior case 22. The response force applying mechanism 3 shown in FIG. 4 includes two electromagnetic solenoids, and one movable weight is provided in the two electromagnetic solenoids so as to be capable of reciprocating in the left-right direction (the X1-X2 direction). Based on a signal of a controlling section, after the movable weight has been attracted by one of the solenoids in the left-right direction (the X1-X2 direction) or a response force generation direction, the movable weight is moved so as to be attracted by the other solenoid in the left-right direction (the X1-X2 direction) or the response force generation direction. A force that is generated when the movable weight is driven or a force that is generated when the movable weight has collided is transferred to the exterior case 22, and a response force in the left-right direction (the X1-X2 direction) is applied to the display device 21 that is fixed to the exterior case 22.

Figure 5:
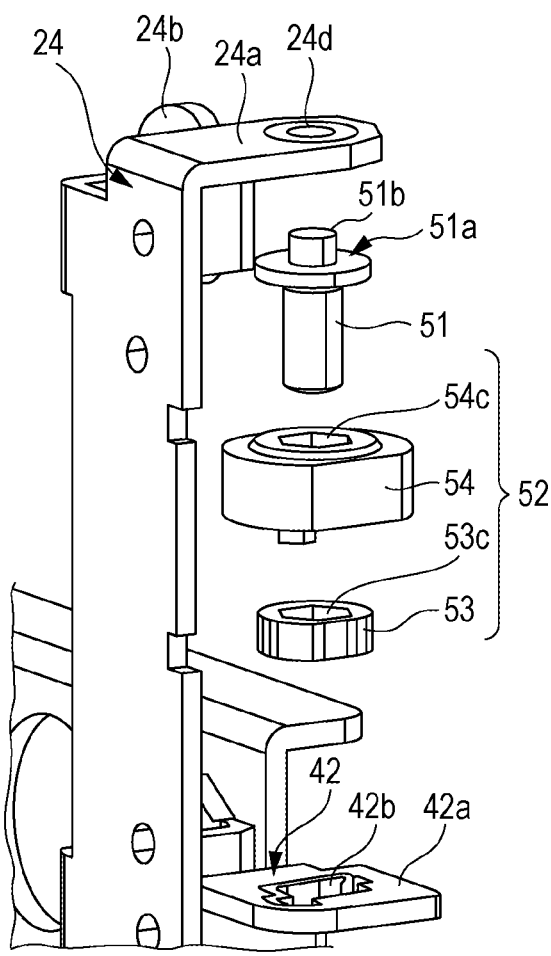
FIG. 5 is an exploded view of a portion of a supporting mechanical section.

As shown in FIGS. 2 and 4, the supporting member 4 is disposed behind the operating unit 2 (in the Z2 direction). The supporting member 4 is fixed to, for example, a dashboard or an instrument panel in a vehicle interior. The supporting member 4 includes a housing 41, a support-side bracket 42, a sub-substrate 43, a main substrate 44, and a connecting receiving section 52. The housing 41 has an opening in the forward direction (in the Z1 direction), and the support-side bracket 42 is fixed to a front side of the housing 41 inside the housing 41, the front side being on a forward side (in the Z1 direction). As shown in FIGS. 4 and 5, the support-side bracket 42 includes a connecting receiving fixing surface 42a at which a bending surfaces faces the up-down direction (the Y1-Y2 direction), a bracket hole section 42b that is formed in the up-down direction (the Y1-Y2 direction), and support-side hook sections 42c that protrude forward (in the Z1 direction). The connecting receiving section 52 is disposed in contact with an upper portion (in the Y1 direction) of the connecting receiving fixing surface 42a of the support-side bracket 42. In the embodiment, the connecting receiving section 52 constitutes a portion of the supporting member 4 and a portion of the supporting mechanical section 5.

As shown in FIG. 4, the sub-substrate 43 is fixed to a front surface of the support-side bracket 42, the front surface facing forward (in the Z1 direction). Operation detecting sections 43a are proximity sensors. When the operating unit 2 is pressed rearward (in the Z2 direction), the detecting surfaces 24b of the movable-side bracket 24 are moved closer to the operation detecting sections 43a of the sub-substrate 43. When the detecting surfaces 24b are within a predetermined distance, the proximity sensors are operated to obtain a detection output. The operation detecting sections 43a are not limited to proximity sensors, and may be, for example, force sensors or mechanical switches. Alternatively, a touch sensor with which the display device 21 is provided may detect the area of a finger that is in contact with the display device 21, and when the detected area becomes greater than a threshold value, may detect that the operating unit 2 has been pressed rearward (in the Z2 direction). The main substrate 44 including a power-supply connector is fixed to a surface of the support-side bracket 42, the surface facing rearward (in the Z2 direction).

Figure 6:
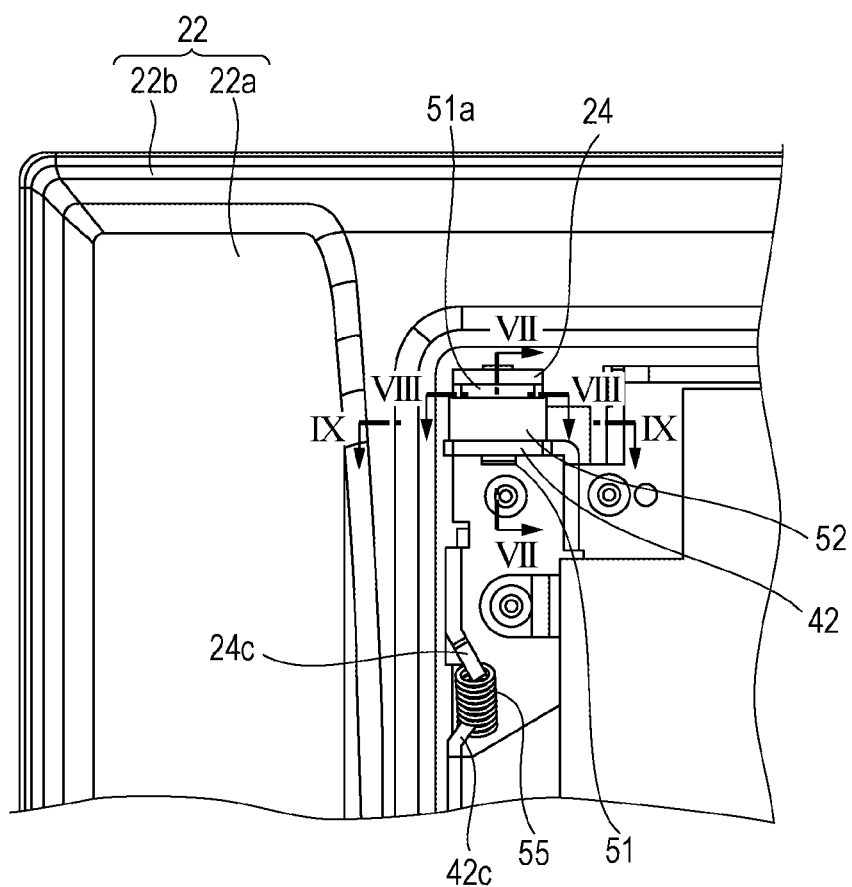
FIG. 6 is a partial rear view of the operating device that is shown in FIG. 2 and that is partially enlarged when the operating device is seen from the rear.

As shown in FIGS. 3 and 4, the supporting mechanical section 5 is provided between the operating unit 2 and the supporting member 4. The supporting mechanical section 5 includes the connecting shaft section 51, the connecting receiving section 52, and restoring members 55. The connecting shaft section 51 constitutes a portion of the operating unit 2 and a portion of the supporting mechanical section 5. The connecting receiving section 52 constitutes a portion of the supporting member 4 and a portion of the supporting mechanical section 5. The restoring members 55 are constituted by helical extension springs. As shown in FIGS. 3 and 6, one end of each restoring member 55 is connected to a corresponding one of the movable-side hook sections 24c of the movable-side bracket, and the other end of each restoring member 55 is connected to a corresponding one of the support-side hook sections 42c of the support-side bracket 42. The movable-side hook sections 24c are positioned rearward (in the Z2 direction) of and above (in the Y1 direction) the support-side hook sections 42c, and the restoring members 55 are provided in an initially stretched state. Therefore, due to an elastic contractive force of each restoring member 55, the operating unit 2 is subjected at all times to a force that causes it to be restored forward (in the Z1 direction), that is, an urging force that causes the operating unit 2 to move away from the supporting member 4 in the forward direction. In addition, the operating unit 2 is urged downward with respect to the supporting member 4, and the position of the connecting shaft section 51 and the position of the connecting receiving section 52 relative to each other are restricted in the up-down direction (the Y1-Y2 direction).

Figure 7:
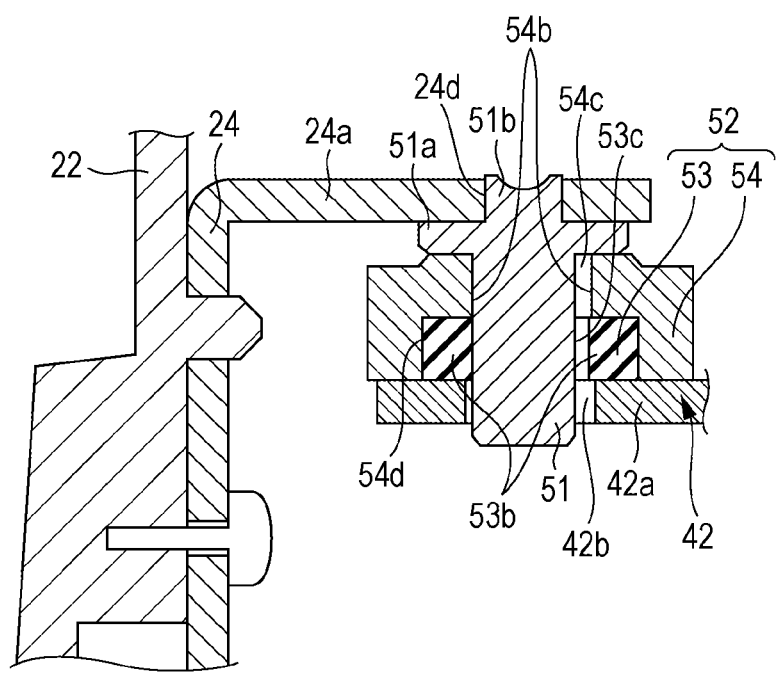
FIG. 7 is a partial enlarged sectional view along line A-A of the operating device shown in FIG. 6.
Figure 7:
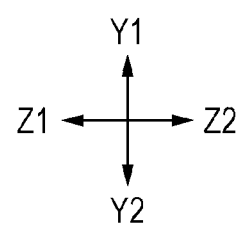
Figure 8:
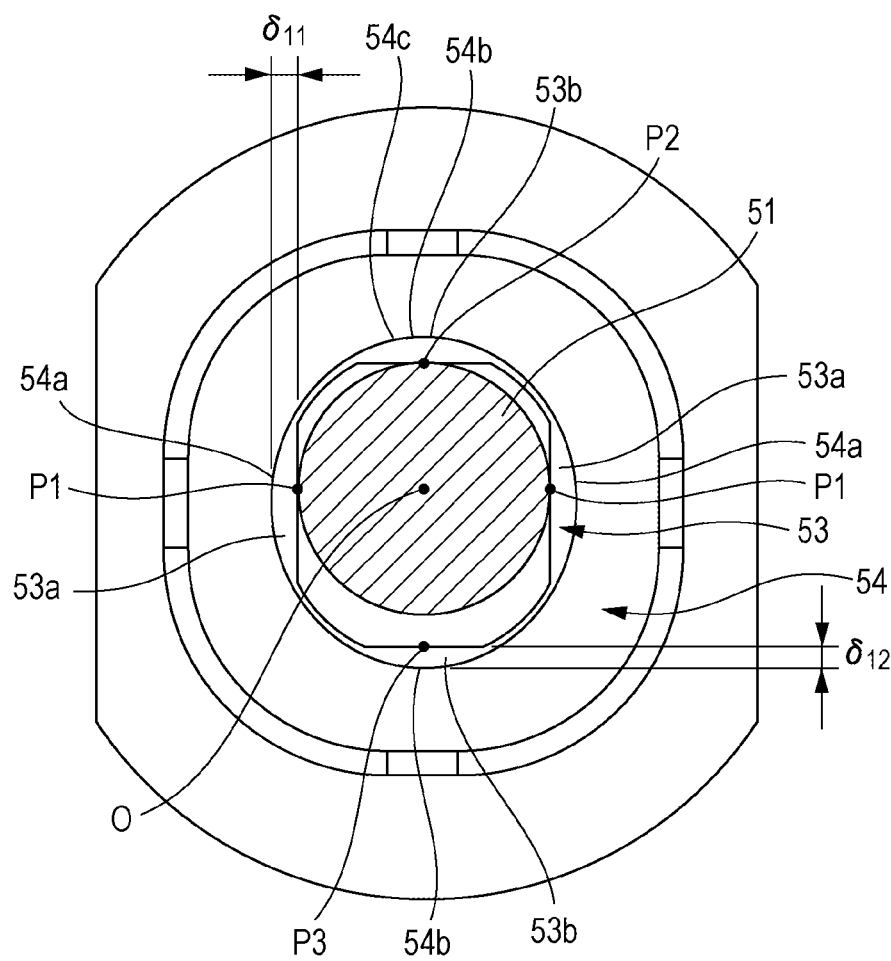
FIG. 8 is a partial enlarged sectional view along line B-B of the operating device shown in FIG. 6.
Figure 8:
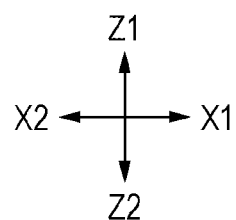
Figure 9:
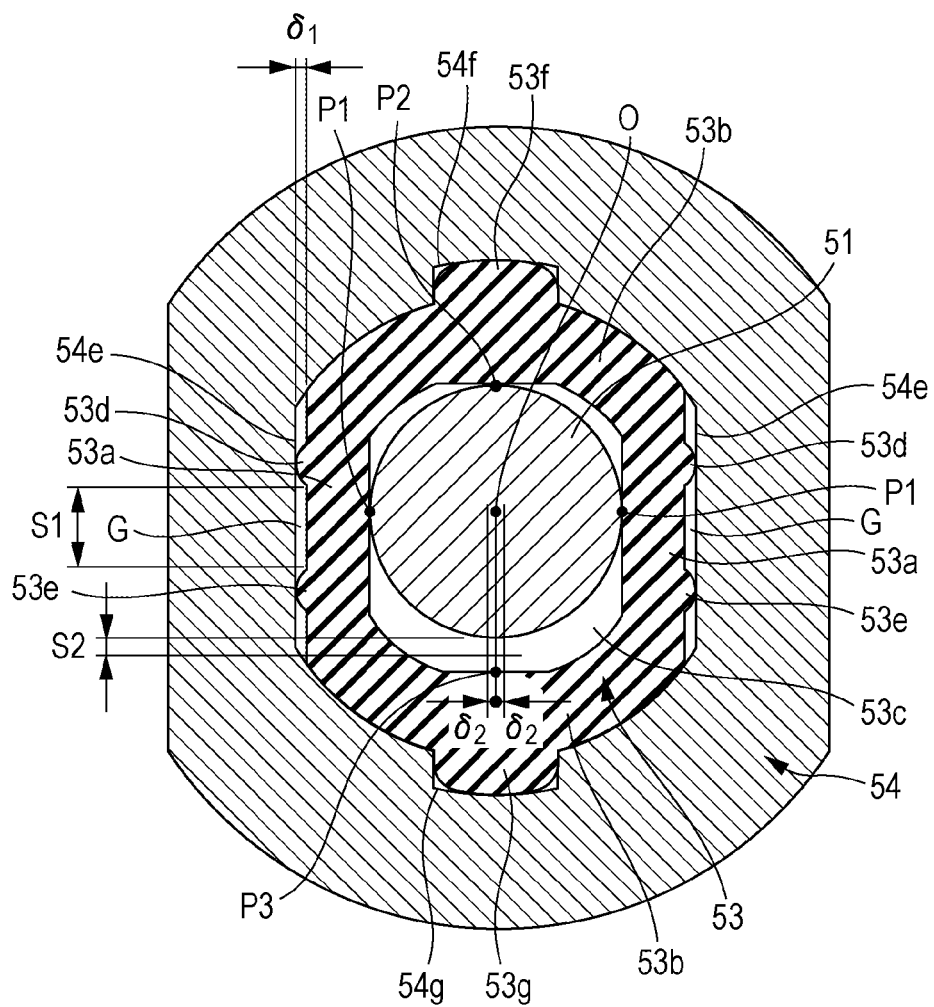
FIG. 9 is a partial enlarged sectional view along line C-C of the operating device shown in FIG. 6.

As shown in FIGS. 5 and 8 and 9, the connecting receiving section 52 includes an elastic body 53 and a restricting body 54. The elastic body 53 is made of an elastic material, such as rubber. The elastic body 53 has an elastic-body hole section 53c in the up-down direction (the Y1-Y2 direction). The size of the elastic-body hole section 53c in the front-rear direction (the Z1-Z2 direction) is larger than the size of the elastic-body hole section 53c in the left-right direction (the X1-X2 direction). The connecting shaft section 51 is inserted and supported in the elastic-body hole section 53c. The restricting body 54 is made of plastic or a metal material having a high elastic modulus. As also shown in FIG. 7, the restricting body 54 has a connecting-shaft-section movable hole 54c and an elastic-body holding recess section 54d disposed below the connecting-shaft-section movable hole 54c in the up-down direction (the Y1-Y2 direction). The size of each of the connecting-shaft-section movable hole 54c and the elastic-body holding recess section 54d in the front-rear direction (the Z1-Z2 direction) is larger than the size of each of the connecting-shaft-section movable hole 54c and the elastic-body holding recess section 54d in the left-right direction (the X1-X2 direction).

As shown in FIGS. 7 and 9, the elastic body 53 is fitted and fixed to the elastic-body holding recess section 54d of the restricting body 54 from below the elastic-body holding recess section 54d in the upward direction. As shown in FIG. 9, a third elastic protrusion 53f protruding in the Z1 direction is formed on a front end of the elastic body 53, and a fourth elastic protrusion 53g protruding in the Z2 direction is formed on a rear end of the elastic body 53. The restricting body 54 includes a third restricting recess section 54f that is positioned in correspondence with the position of the third elastic protrusion 53f of the elastic body 53, and a fourth restricting recess section 54g that is positioned in correspondence with the position of the fourth elastic protrusion 53g of the elastic body 53.

The third elastic protrusion 53f of the elastic body 53 is fitted to the third restricting recess section 54f of the restricting body 54. The fourth elastic protrusion 53g of the elastic body 53 is fitted to the fourth restricting recess section 54g of the restricting body 54. Therefore, even if a force for rotating the elastic body 53 in a direction along a sheet plane in FIG. 9 acts upon the elastic body 53, the elastic body 53 is held in the proper position inside the restricting body 54 without the elastic body 53 being rotated.

As shown in FIG. 9, two first elastic protrusions 53d and two second elastic protrusions 53e are integrated on corresponding outer sides of the elastic body 53 in the left-right direction (the X1-X2 direction), that is, on corresponding outer sides of the elastic body 53 opposite to the elastic-body hole section 53c that supports the connecting shaft section 51. The two first elastic protrusions 53d are positioned forward of the center of gravity of the elastic body 53 (in the Z1 direction) and protrude in a corresponding one of the X1 direction and the X2 direction. The two second elastic protrusions 53e are positioned rearward of the center of gravity of the elastic body 53 (in the Z2 direction) and protrude in a corresponding one of the X1 direction and the X2 direction. The first elastic protrusions 53d are disposed apart from the second elastic protrusions 53e by a distance S1 in terms of inside dimensions in the front-rear direction (the Z1-Z2 direction) on the outer side of the elastic body 53 in the X1 direction and on the outer side of the elastic body 53 in the X2 direction. As shown in FIG. 9, when the operating unit 2 is ordinarily operated, the distance S1 is larger than a distance S2 in which the connecting shaft section 51 moves rearward (in the Z2 direction) inside the elastic-body hole section 53c. The distance S2 is a distance in which the connecting shaft section 51 moves rearward from when an operator starts moving the operating unit 2 rearward to when the operation detecting section 43a detects that the operating unit 2 has been pressed rearward (in the Z2 direction).

As shown in FIG. 9, planar restricting walls 54e extending in the front-rear direction (the Z1-Z2 direction) are formed on corresponding left and right sides inside the elastic-body holding recess section 54d of the restricting body 54. The first elastic protrusions 53d and the second elastic protrusions 53e protruding from the corresponding outer sides of the elastic body 53 in the left-right direction (the X1-X2 direction) are somewhat pressed against and are in contact with the corresponding restricting walls 54e. A gap G is formed in the left-right direction in an area surrounded by one of the first elastic protrusions 53d, one of the second elastic protrusions 53e, and one of the restricting walls 54e, and a gap G is formed in the left-right direction in an area surrounded by the other first elastic protrusion 53d, the other second elastic protrusion 53e, and the other restricting wall 54e. Therefore, the elastic body 53 is such that the regions extending over the distance S1 between the first elastic protrusions 53d and the corresponding second elastic protrusions 53e are flexural deformation regions. As shown in FIG. 9, when the response force applying mechanism 3 applies a response force to the operating unit 2 and the operating unit 2 moves in the left-right direction, if a movement amount of an axial center O of the connecting shaft section 51 towards the left or right from its neutral position is δ2, a distance δ1 over which each gap G extends in the left-right direction (the X1-X2 direction) is set larger than the movement amount 32.

As shown in FIGS. 5 and 7, a flange body 51a and a fixed shaft section 51b protruding upward from the flange body 51a are integrated at an upper end portion of the connecting shaft section 51. The flange body 51a protrudes in a direction of the outside diameter of the connecting shaft section 51 to have a disc shape. The diameter of the fixed shaft section 51b is smaller than the diameter of the flange body 51a.

As shown in FIG. 7, the connecting shaft section 51 is fixed to the connecting protrusion fixing surface 24a by inserting and crimping the fixed shaft section 51b with respect to a connecting protrusion fixing hole 24d formed in the connecting protrusion fixing surface 24a of the movable-side bracket 24. The flange body 51a is disposed in contact with a lower portion (in the Y2 direction) of the connecting protrusion fixing surface 24a of the movable-side bracket 24. The connecting shaft section 51 is inserted downward into the connecting-shaft-section movable hole 54c of the restricting body 54 and the elastic-body hole section 53c of the elastic body 53, and a lower end portion of the connecting shaft section 51 is inserted into the bracket hole section 42b formed in the support-side bracket 42.

The movable-side bracket 24, which is a portion of the operating unit 2, is urged downward by a spring force of each restoring member 55. Therefore, the flange body 51a disposed below (in the Y2 direction) the movable-side bracket is pressed downward against an upper surface of the restricting body 54 of the connecting receiving section 52. Therefore, the position of the connecting shaft section 51 and the connecting receiving section 52 relative to each other in the up-down direction (the Y1-Y2 direction) are restricted.

As shown in FIGS. 8 and 9, portions of the elastic body 53 are first elastic members 53a and the other portions of the elastic body 53 are second elastic members 53b. The connecting shaft section 51 is positioned in the elastic-body hole section 53c of the elastic body 53. While the connecting shaft section 51 moves in the front-rear direction (the Z1-Z2 direction), a contact portion P1 between a left outer side of the connecting shaft section 51 and the elastic body 53 and a contact portion P1 between a right outer side of the connecting shaft section 51 and the elastic body 53 move in the front-rear direction. Regions in which at least the contact portions P1 of the elastic body 53 move in the front-rear direction are the first elastic members 53a. Although the elastic body 53 is such that the regions extending over the distances S1 between the first elastic protrusions 53d and the corresponding second elastic protrusions 53e are the flexural deformation regions, portions including the flexural deformation regions are the first elastic members 53a. The first elastic members 53a continue supporting corresponding sides of the connecting shaft section 51 in the left-right direction (the X1-X2 direction) while the connecting shaft section 51 moves in the front-rear direction.

As shown in FIG. 9, when the connecting shaft section 51 moves forward (in the Z1 direction), the connecting shaft section 51 comes into contact with the elastic body 53 at a contact portion P2, and when the connecting shaft section 51 moves rearward (in the Z2 direction), the connecting shaft section 51 comes into contact with the elastic body 53 at a contact portion P3. The elastic body 53 is such that a forward region including the contact portion P2 and a rearward region including the contact portion P3 are the second elastic members 53b.

As shown in FIG. 8, the connecting shaft section 51 is movably positioned in the connecting-shaft-section movable hole 54c of the restricting body 54. Portions of inner edge portions of the connecting-shaft-section movable hole 54c are first restricting sections 54a, and the other portions of the inner edge portions of the connecting-shaft-section movable hole 54c are second restricting sections 54b. While the contact portions P1 between the connecting shaft section 51 and the elastic-body hole section 53c move in the front-rear direction, the first restricting sections 54a that are spaced apart from the contact portions P1 and P1 face the contact portions P1 and P1 from the left and right. One of the second restricting sections 54b that is spaced apart from the contact portion P2 between the connecting shaft section 51 and the elastic-body hole section 53c on the front side faces the contact portion P2, and the other second restricting section 54b that is spaced apart from the contact portion P3 on the rear side faces the contact portion P3.

As shown in FIG. 8, each first restricting section 54a and a corresponding one of the contact portions P1 are spaced apart from each other by a distance δ11 at most, and each first elastic member 53a that is in contact with the connecting shaft section 51 at the contact portion P1 protrudes toward the connecting shaft section 51 from a corresponding one of the first restricting sections 54a by the distance δ11 at most. The second restricting sections 54b and the corresponding contact portions P2 and P3 are spaced apart from each other by a distance δ12 at most, the second elastic member 53b that is in contact with the connecting shaft section 51 at the contact portion P2 protrudes towards the connecting shaft section 51 from a corresponding one of the first restricting sections 54a by the distance δ12 at most, and the second elastic member 53b that is in contact with the connecting shaft section 51 at the contact portion P3 protrudes towards the connecting shaft section 51 from a corresponding one of the second restricting sections 54b by the distance δ12 at most.

Next, an operation of the operating device 1 is described.

In the operating device 1 used as an on-vehicle display device, when a user touches any location on the operating section 21b with his/her finger while viewing an image displayed on the display screen 21a of the display device 21 of the operating unit 2, which portion of the image was touched by the user's finger is determined based on a coordinate detection output from the touch sensor.

When the user presses the display screen 21a rearward (in the Z2 direction) with this finger, a pressing force thereof acts upon the movable-side bracket 24 from the exterior case 22, and the restoring members 55 provided between the movable-side bracket 24 and the support-side bracket 42 are from an initial state in which they are initially stretched further pulled and deformed, as a result of which the operating unit 2 is moved rearward (in the Z2 direction) toward the supporting member 4. At this time, an operation opposing force that is applied to the user's finger from the display screen 21a is determined based on a pull-deformation spring constant of each restoring member 55.

When the distances between the detecting surfaces 24b of the movable-side bracket 24 of the operating unit 2 and the operation detecting sections 43a of the sub-substrate 43 of the supporting member 4 fall within a predetermined distance, it is detected that the display screen 21a has been pressed. Based on a detection output of the touch sensor and detection outputs of the operation detecting sections 43a, and based on an image signal of the image displayed on the display screen 21a, a body controlling section (not shown) determines what kind of operation has been performed to start a processing operation based on the intended operation.

When the operation detecting sections 43a have detected that the operating unit 2 has been pressed rearward (in the Z2 direction), an operation command for generating a response force is output from the body controlling section to drive the response force applying mechanism 3. A response force (acceleration) in the left-right direction (the X1-X2 direction) that is generated by the response force applying mechanism 3 is applied to the operating unit 2. The response force generated at this time is a one-time force that causes the operating unit 2 to reciprocate in the left-and-right direction (the X1-X2 direction) in one period, or is a vibration force that causes the operating unit 2 to reciprocate in the left-and-right direction (the X1-X2 direction) in a plurality of periods.

As shown in FIGS. 8 and 9, while the connecting shaft section 51 of the supporting mechanical section 5 is moved rearward (in the Z2 direction) by the pressing operation of the user, the first elastic members 53a of the elastic body 53 constituting the connecting receiving section 52 continue supporting the connecting shaft section 51 from both sides thereof in the left-right direction (the X1-X2 direction). As shown in FIG. 9, when the connecting shaft section 51 moves rearward (in the Z2 direction), the axial center O of the connecting shaft section 51 is positioned rearward of the first elastic protrusions 53d and forward of the second elastic protrusions 53e. Further, the distance δ1 in the left-right direction (the X1-X2 direction) over which each gap G shown in FIG. 9 extends is set larger than the movement amount δ2 by which the operating unit 2 moves toward the left or right from the neutral position as a result of the response force applying mechanism 3 applying a response force to the operating unit 2.

Therefore, when the response force applying mechanism 3 applies a response force to the operating unit 2 and the first elastic members 53a of the connecting receiving section 52 are pushed by the connecting shaft section 51 in the left-right direction (the X1-X2 direction), the first elastic members 53a are flexed and deformed in the left-right direction (the X1-X2 direction) by amounts corresponding to the distances over which the gaps G extend in the flexural deformation regions between the first elastic protrusions 53d and the second elastic protrusions 53e. The connecting shaft section 51 is reliably held in the X1-X2 direction by the left and right first elastic members 53a by setting the elastic modulus based on the flexural deformation of each flexural deformation region to an excess value and causing each first elastic member 53a to have a high rigidity. Even if the operating unit 2 is one having a relatively large mass due to, for example, the display device 21 and the backlight unit being built in the exterior case 22, the connecting shaft section 51 is capable of being firmly held without rattling caused by, for example, vibration of a vehicle body.

Even if each first elastic member 53a has a high rigidity, when the response force applying mechanism 3 accelerates the operating unit 2 in the X1-X2 direction, the first elastic members 53a are pushed by the connecting shaft section 51 and are flexed and deformed in the X1 direction or the X2 direction. Therefore, the likelihood of the response force that is generated by the response force applying mechanism 3 being lost due to an elastic opposing force of the elastic body 53 decreases. Consequently, when the response force applying mechanism 3 accelerates the operating unit 2, the operating unit 2 is capable of moving by a relatively large amplitude in the X1-X2 direction, and the response force is capable of being efficiently, that is, simply transferred to the user. Since the response force applying mechanism 3 accelerates the operating unit 2 in the left-right direction, even if the vehicle body is violently vibrated in the front-rear direction, the user's finger operating the operating unit 2 can clearly feel the response force.

The connecting shaft section 51 first comes into contact with the first elastic members 53a. The first elastic members 53a are first flexed and deformed and are then compressed and deformed. The force used to compress and deform the first elastic members 53a is larger than the force used to flex and deform the first elastic members 53a. Since the force used to compress and deform the first elastic members 53a is large, the operating unit 2 is subjected to a large resistance force by the elastic resistance of the first elastic members 53a.

When a user presses the display screen 21a with his/her finger, it is desirable to cause the operator to feel as if the operator feels that the operating unit is firmly mounted. That is, when the user has pressed the display screen 21a rearward (in the Z2 direction), it is desirable that the elastic resistance generated by the restoring members 55 being pulled and deformed be large. In contrast, when the response force applying mechanism 3 has applied a response force to the operating unit 2, in order to apply a large force to the user's finger from the operating unit 2, it is desirable that the elastic resistance that is produced when the operating unit 2 moves in the left-right direction (the X1-X2 direction) be small. Therefore, it is desirable that a force used to move the operating unit 2 in the left-right direction (the X1-X2 direction) in opposition to the elastic opposing force caused by flexing and deforming the first elastic members 53a be smaller than a force used to move the operating unit 2 rearward (in the Z2 direction).

As shown in FIGS. 7 and 8, portions of the elastic body 53 are the second elastic members 53b facing each other in the front-rear direction (the Z1-Z2 direction), and portions of peripheral edge portions of the connecting-shaft-section movable hole 54c are the second restricting sections 54b facing each other in the front-rear direction. The front and rear second elastic members 53b protrude toward the side of the connecting shaft section 51 from the front and rear second restricting sections 54b. Therefore, when the operating unit 2 is subjected to an excess force in the front-rear direction (the Z1-Z2 direction), the connecting shaft section 51 first comes into contact with the second elastic member 53b, and the second elastic member 53b is compressed and deformed. Since a large force is used to compress and deform the second elastic member 53b, the operating unit 2 is subjected to a large resistance force by the second elastic member 53b. Thereafter, the connecting shaft section 51 comes into contact with the second restricting section 54b. After the connecting shaft section 51 has been subjected to the resistance force by the second elastic member 53b, the connecting shaft section 51 comes into contact with the second restricting section 54b. Therefore, after the excess force applied to the operating unit 2 has been decreased by the elastic resistance of the second elastic member 53b, the connecting shaft section 51 comes into contact with the second restricting section 54b, as a result of which it becomes possible to prevent breakage of the components constituting the supporting mechanical section 5 and to reduce noise caused by collision between the connecting shaft section 51 and the second restricting section 54b.

Similarly, a user may push or pull the operating unit 2 in the left-right direction (the X1-X2 direction) with excess force. Since the operating device 1 is used as an on-vehicle display device, the operating unit 2 may be strongly vibrated in the left-right direction (the X1-X2 direction).

As shown in FIGS. 7 and 8, portions of the elastic body 53 are the first elastic members 53a that support the connecting shaft section 51 from the left-right direction, and portions of peripheral edge portions of the connecting-shaft-section movable hole 54c are the first restricting sections 54a facing each other in the left-right direction. The left and right first elastic members 53a protrude toward the side of the connecting shaft section 51 from the left and right first restricting sections 54a. As shown in FIG. 8, since the contact portion P1 between the connecting shaft section 51 and one of the first elastic members 53a and the contact portion P1 between the connecting shaft section 51 and the other first elastic member 53a are positioned at all times in the corresponding flexural deformation regions of the first elastic members 53a, when the connecting shaft section 51 moves towards the left and right and pushes the first elastic members 53a towards the respective leftward direction and rightward direction, the first elastic members 53a are first flexed and deformed, and when the distance δ1 over which each gap G shown in FIG. 4 extends becomes zero, the first elastic members 53a are then compressed and deformed. A force used to compress and deform the first elastic members 53a is larger than a force used to flex and deform the first elastic members 53a.

When the response force applying mechanism 3 has largely accelerated the operating unit 2 in the left-right direction, or when the operating unit 2 has been largely accelerated by an external force, such as by vibration of a vehicle body, the first elastic members 53a are compressed and deformed after being flexed and deformed, and elastic opposing force that is generated at this time is large. Therefore, movement of the connecting shaft section 51 in the left-right direction is subjected to a braking force. When the connecting shaft section 51 is further moved in either the left direction or the right direction in opposition to the braking force, the connecting shaft section 51 comes into contact with the first restricting section 54a. After the connecting shaft section 51 has been subjected to a large resistance force by the first elastic member 53a, the connecting shaft section 51 comes into contact with the first restricting section 54a. Therefore, after excess force applied to the operating unit 2 has been decreased by the elastic resistance of the first elastic member 53a, the connecting shaft section 51 comes into contact with the first restricting section 54a, as a result of which it becomes possible to prevent breakage of the components constituting the supporting mechanical section 5. In addition, it is possible to reduce impact sound caused by collision between the connecting shaft section 51 and the first restricting section 54a.

The distance δ11 shown in FIG. 8 is set so that when the first elastic members 53a are flexed and deformed, the connecting shaft section 51 does not come into contact with the first restricting sections 54a, and when the first elastic members 53a after being flexed and deformed are further compressed and deformed, the connecting shaft section 51 comes into contact with the first restricting sections 54a.

As shown in FIG. 8, the first elastic members 53a protrude toward the side of the connecting shaft section 51 from the first restricting sections 54a. The second elastic members 53b protrude toward the side of the connecting shaft section 51 from the second restricting sections 54b. Therefore, when a small vibrational load is applied to the operating unit 2, the connecting shaft section 51 comes into contact with the first elastic members 53a and the second elastic members 53b, and do not come into contact with the first restricting sections 54a and the second restricting sections 54b. Since the first restricting sections 54a and the second restricting sections 54b of the restricting body 54 are made of plastic or a metal material having a high elastic modulus, when the first restricting sections 54a and the second restricting sections 54b come into contact with the connecting shaft section 51, a large noise may be produced. However, since the first elastic members 53a and the second elastic members 53b of the elastic body 53 are made of an elastic material, such as rubber, when the first elastic members 53a and the second elastic members 53b come into contact with the connecting shaft section 51, large noise is unlikely to be produced. Therefore, when the operating device 1 of the embodiment is ordinarily used, the operating device 1 is one that does not produce large noise.

Although in the supporting mechanical section 5 of the embodiment, the connecting shaft section 51 is provided on the side of the operating unit 2 and the connecting receiving section 52 is provided on the side of the supporting member 4, the connecting receiving section 52 may be provided on the side of the operating unit 2 and the connecting shaft section 51 may be provided on the side of the supporting member 4.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An operating device comprising:
   an operating unit that includes an operating section;
   a supporting member that supports the operating unit;
   a supporting mechanical section that is provided between the operating unit and the supporting member;
   an operation detecting section that detects that the operating unit has been pressed rearward; and
   a response force applying mechanism that applies a response force to the operating unit, the response force being oriented in a second direction intersecting a first direction that is a front-rear direction,
   wherein in the supporting mechanical section a connecting shaft section is provided at one of the operating unit and the supporting member and a connecting receiving section is provided at the other of the operating unit and the supporting member, and the connecting shaft section is supported by the connecting receiving section so as to be movable in the first direction,
   wherein a restoring member that causes the operating unit to be restored forward is provided, and
   wherein the connecting receiving section includes a first elastic member that continues supporting the connecting shaft section from both sides thereof in the second direction while the connecting shaft section moves in the first direction.

2. The operating device according to claim 1, wherein when the first elastic member is pushed in the second direction by the connecting shaft section, the first elastic member is first flexed and deformed in the second direction and is then compressed and deformed, and wherein a force used to compress and deform the first elastic member is larger than a force used to flex and deform the first elastic member.

3. The operating device according to claim 1, wherein the connecting receiving section includes a first restricting section that is spaced apart from the connecting shaft section on both sides thereof in the second direction and that faces the connecting shaft section, and wherein the first elastic member protrudes toward a side of the connecting shaft section from the first restricting section.

4. The operating device according to claim 3, wherein when the first elastic member is flexed and deformed, the first restricting section is disposed at a position where the first restricting section does not come into contact with the connecting shaft section.

5. The operating device according to claim 1, wherein the first elastic member includes a first elastic protrusion and a second elastic protrusion on outer sides thereof opposite to a side where the connecting shaft section is supported, the first elastic protrusion and the second elastic protrusion protruding in the second direction and being spaced apart from each other in the first direction; the connecting receiving section includes a restricting wall with which the first elastic protrusion and the second elastic protrusion come into contact; and at least a portion of the first elastic member between the first elastic protrusion and the second elastic protrusion is capable of being flexed and deformed; and
   wherein while the connecting shaft section moves in the first direction, the connecting shaft section and the first elastic member continue contacting each other between the first elastic protrusion and the second elastic protrusion.

6. The operating device according to claim 1, wherein the connecting receiving section includes a second elastic member with which the connecting shaft section comes into contact when the connecting shaft section has moved forward in the first direction and when the connecting shaft section has moved rearward in the first direction.

7. The operating device according to claim 6, wherein the first elastic member and the second elastic member are portions of a same elastic body.

8. The operating device according to claim 6, wherein the connecting receiving section includes a second restricting section facing the connecting shaft section in the front-rear direction, and wherein the second elastic member protrudes toward the side of the connecting shaft section from the second restricting section.

9. The operating device according to claim 8, wherein in the supporting mechanical section, a position of the connecting shaft section and a position of the connecting receiving section relative to each other are restricted in a third direction intersecting both the first direction and the second direction.

10. The operating device according to claim 9, wherein the operating unit includes a display device and an exterior case that holds the display device.

11. The operating device according to claim 10, wherein the operating section is provided at a display screen of the display device.

12. An operating device comprising:
an operating unit that includes an operating section facing forward;
a supporting member that supports the operating unit; and
a response force applying mechanism that applies a response force to the operating unit, the response force being oriented in a second direction other than a first direction that is a front-rear direction,
wherein a connecting shaft section is provided at one of the operating unit and the supporting member and a connecting receiving section is provided at the other of the operating unit and the supporting member, and the connecting shaft section is supported by the connecting receiving section so as to be movable in the first direction, and
wherein the connecting receiving section includes a first elastic member that continues supporting the connecting shaft section from both sides thereof in the second direction while the connecting shaft section moves in the first direction.

13. The operating device according to claim 12, wherein when the first elastic member is pushed in the second direction by the connecting shaft section, the first elastic member is first flexed and deformed in the second direction and is then compressed and deformed, and wherein a force used to compress and deform the first elastic member is larger than a force used to flex and deform the first elastic member.

14. The operating device according to claim 12, wherein the connecting receiving section includes a first restricting section that is spaced apart from the connecting shaft section on both sides thereof in the second direction and that faces the connecting shaft section, and wherein the first elastic member protrudes toward a side of the connecting shaft section from the first restricting section.

15. The operating device according to claim 14, wherein when the first elastic member is flexed and deformed, the first restricting section is disposed at a position where the first restricting section does not come into contact with the connecting shaft section.

16. The operating device according to claim 12, wherein the first elastic member includes a first elastic protrusion and a second elastic protrusion on outer sides thereof opposite to a side where the connecting shaft section is supported, the first elastic protrusion and the second elastic protrusion protruding in the second direction and being spaced apart from each other in the first direction; the connecting receiving section includes a restricting wall with which the first elastic protrusion and the second elastic protrusion come into contact; and at least a portion of the first elastic member between the first elastic protrusion and the second elastic protrusion is capable of being flexed and deformed; and
wherein while the connecting shaft section moves in the first direction, the connecting shaft section and the first elastic member continue contacting each other between the first elastic protrusion and the second elastic protrusion.

17. The operating device according to claim 12, wherein the connecting receiving section includes a second elastic member with which the connecting shaft section comes into contact when the connecting shaft section has moved forward in the first direction and when the connecting shaft section has moved rearward in the first direction.

18. The operating device according to claim 17, wherein the first elastic member and the second elastic member are portions of one elastic body.

19. The operating device according to claim 17, wherein the connecting receiving section includes a second restricting section facing the connecting shaft section in the front-rear direction, and wherein the second elastic member protrudes toward the side of the connecting shaft section from the second restricting section.

20. The operating device according to claim 12, wherein the operating unit includes a display device and the operating section is provided at a display screen of the display device.

* * * * *